Patented Jan. 28, 1936

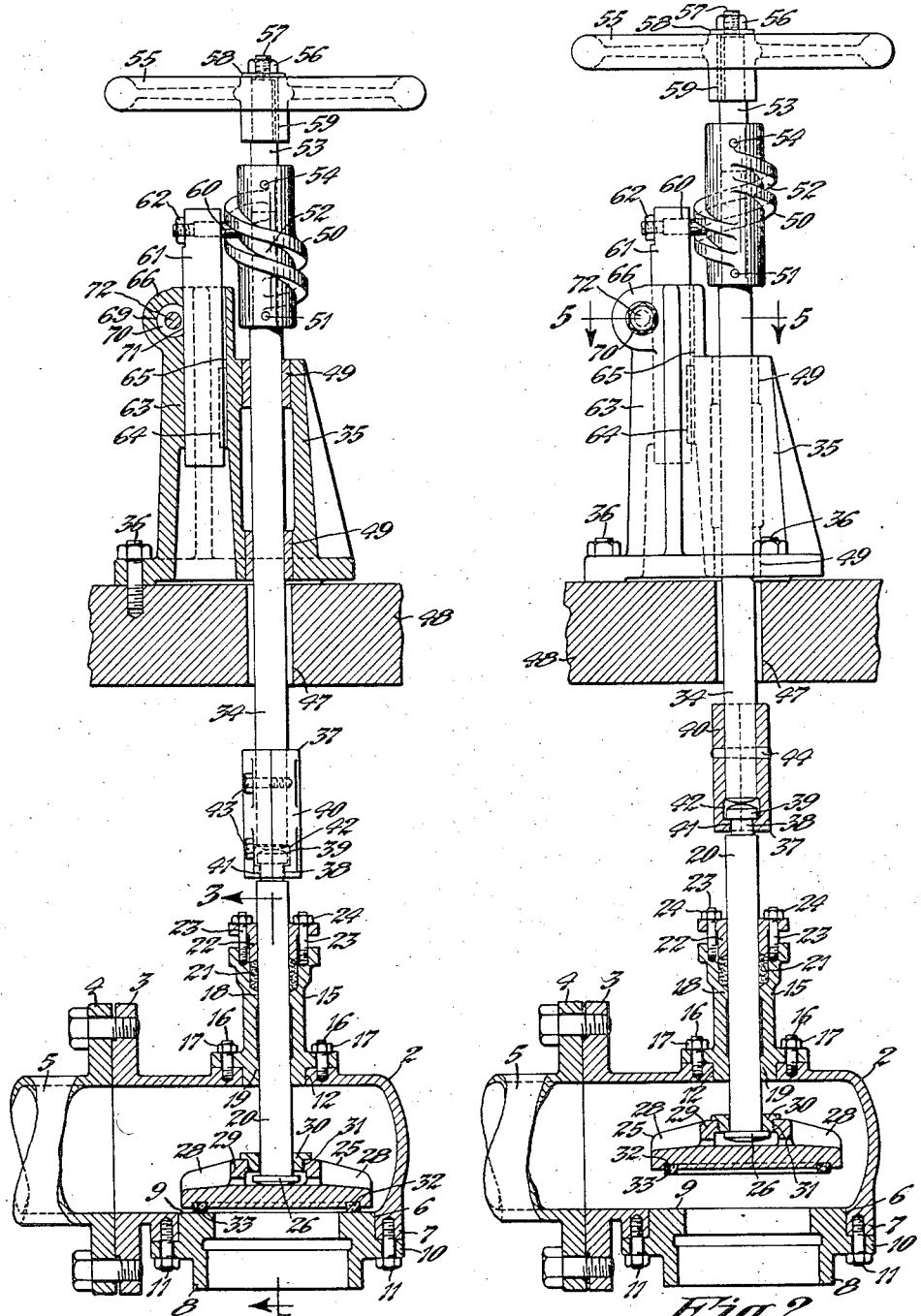

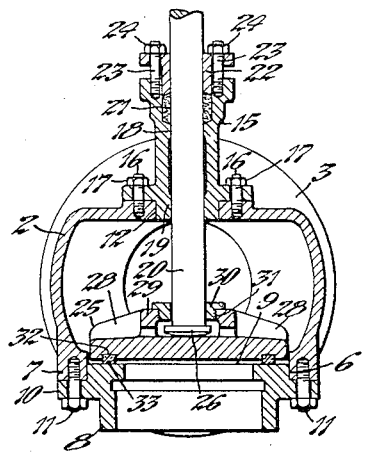

2,028,815

UNITED STATES PATENT OFFICE 2,028,815

VALVE

John Midgley Wood, Cranston, R. I., assignor to Franklin Process Company, Providence, R. I., a corporation of Rhode Island Application June 1, 1934, Serial No. 728,506

6 Claims. (Cl. 251—40)

This invention consists in a quick-acting valve adapted for operation by remote control. The present improved valve is particularly adapted for use in dye houses, bleaching and finishing plants but may also be applied to other uses.

One object of the invention is to provide a valve of the type indicated having manually operable means for opening and closing the valve with a quick action.

Another object of the invention is to provide a valve of the type indicated having means for controlling its opening and closing which may be operated at a point remote from the valve itself.

Another object of the invention is to provide a valve of the type indicated having a removable seat which may be repeatedly refinished and replaced to maintain a tight fit with the closure.

Another object of the invention is to provide a valve of the type indicated which is economical to manufacture, easy to install and efficient and durable in use.

Further objects of the invention are set forth in the following specification which describes a preferred form of construction of the valve and its control means, by way of example, as illustrated by the accompanying drawings. In the drawings:

Fig. 1 is a vertical sectional view through the valve showing the closure closed against its seat;

Fig. 2 is a similar view showing the closure removed from its seat;

Fig. 3 is a sectional view of the valve taken on line 3—3 of Fig. 1, looking in the direction indicated by the arrow and illustrating the manner in which the valve-closure engages with its removable seat after the surface of the latter has been refinished;

Fig. 4 is a plan view of a portion of the control means for the valve ; and

Fig. 5 is a similar view, part sectional on the line 5—5 of Fig. 2.

The present improved valve is adapted to various and sundry applications and particularly for use in the feed or exhaust lines of dye houses, finishing plants and other industrial establishments where it is desired to regulate and control the flow of fluid at a point remote from the valve. In the present drawings the valve is shown as connected to be operated from control means located at a distance thereabove, for example, on the floor above that on which the valve is installed.

Referring to Figs. 1, 2 and 3 of the drawings, 2 designates the valve casing or housing which may be of any suitable form and provided with a flange 3 for connecting it with the flange 4 of a feed pipe or other conduit 5. Considering the flanged end of the housing 2 as the inlet end of the valve, the outlet is located on the bottom or under side of the housing; but it is to be understood that the flow through the valve may be in the opposite direction, in which case the opening 6 on its under side would become the inlet.

The opening 6 may be of generally circular shape with a thickened flange or wall 7 surrounding its rim. The inner and bottom faces of the flange 7 are machined to receive an annular fitting 8 which is provided at its upper end with a finished face 9 constituting a flat closure-seat for the valve. The fitting 8 is flanged at 10 to underlie the bottom face of the finished flange 7 on the valve housing 2, a suitable number of bolts or studs 11 being employed to secure the fitting 8 in place in the opening 6 in the housing.

Fitted in a smaller opening 12 in the upper wall of the housing 2 in axial alinement with the opening 6 is a flanged neck-like bearing member 15 secured in place by studs 16 and nuts 17. The member 15 is provided with spaced bearings 18 and 19 for a spindle or stem 20 for the valve-closure 25. The upper end of the member 15 is counterbored or cupped to receive suitable packing material, indicated at 21, which is held under compression by a gland-member 22 secured in place by studs 23 and nuts 24 in accordance with the usual arrangement of a stuffing box. The stem 20 is slidable in the member 15 and has a flanged head 26 at its lower end slightly convexed on its under side.

The valve-closure 25 may be of circular or disk form with a plurality of stiffening ribs 28 on its upper side which radiate from a hub portion 29. A collar 30 loose on the stem 20 abutting its end head 26 is threaded to screw into a bore 31 in the hub 29. The convex bottom of the head 26 is adapted to ride against the top of the closure-disk 25 to force the latter down against its seat 9, constituted by the upper finished face of the fitting 8. Preferably, the under side of the valve-closure or disk 25 is formed with a rabbeted groove 32, in which is fitted an annular gasket 33 constructed of bronze or other suitable material. When the spindle or stem 20 is slid down through its bearings in the member 15 the gasket or ring 33 will seat firmly against the finished face 9 of the fitting 8 to effect a tight closure of the outlet from the valve housing 2. Preferably, the bore of the collar 30 through which the stem 20 passes is slightly larger in diameter than the stem so as to provide that the valve-closure 25 may rock slightly to conform to the level of the seat 9.

As providing one feature of improvement of the present invention, the valve-closure 25 is constructed slightly smaller in diameter than the opening 6 in which the fitting 8 is held. The purpose of this form of construction is to provide that the seat 9 may be ground down or otherwise refaced when it becomes worn and the fitting 8 replaced in the housing 2 in such position that the closure 25 will still seat thereagainst, see Fig. 3 of the drawings. In this view the valve-closure 25 is shown as passing partly into the bottom opening 6 in the valve housing 2 to adapt its gasket 33 to seat against the face 9 on the fitting 8.

The present improved valve may be controlled by any suitable means for sliding the spindle or stem 20 through the bearing member 15 to operate the closure 25. To adapt the valve for remote control, the upper end of the stem 20 is connected to an extension rod or shaft 34 which is slidable in a bracket or standard 35 which may be mounted on an upper floor or in any other desired location above the valve. The standard 35 is provided with a flange fastened to the floor 48 by means of studs or bolts 36. It will be noted that the valve-closure stem 20 is relatively short as compared to the operating rod or shaft 34. This arrangement is of advantage since the valve-stem 20 must usually be constructed of acid-resisting material to prevent corrosion, and as such materials are much more expensive than ordinary steel rod a saving is made in the cost of the fittings.

The upper extension rod 34 is connected to the stem 20 by means of a universal coupling 37 which renders it unnecessary to secure exact alinement of the parts. As shown in Fig. 2, the upper end of the stem 20 is reduced in diameter to provide a neck 38 terminating in a head 39 formed with a convex end. Surrounding the end of the extension rod 34 is a split sleeve 40 constituted by opposite complementary halves. At the lower end of the sleeve 40 is a bore 41 for receiving the neck 38 on the stem 20 and thereabove is a counterbore 42 for receiving the head 39. The two halves of the sleeve 40 are clamped to the lower end of the extension rod 34 by means of bolts 43 and a tapered pin 44 driven through the sleeve and the rod keys the parts rotatively together.

The operating shaft or extension rod 34 projects upwardly through an opening 47 in the floor 48 and is journaled in spaced bearings 49 in the bracket or standard 35, previously referred to. Mounted on the reduced upper end of the rod or shaft 34 is a helical cam 50 secured thereto for rotation therewith by suitable means such as a cross-pin 51. The cam 50 has a single helical thread-groove 52 which is engaged by suitable fixed means, to be later described, whereby when the shaft 34 is turned in its bearings it will be slid longitudinally to open or close the valve in the manner as later explained.

A stub-shaft 53 held in the bore of the hub of the cam 50 is secured thereto by means of a cross-pin 54 and keyed to its upper end is a handwheel 55. The handwheel 55 may be secured to the upper end of the stub-shaft 53 by means of a nut 56 screwed onto the reduced threaded end 57 of the shaft against a washer 58. The hub of the wheel 55 is splined and keyed rotatively with the shaft at 59.

The helical groove 52 in the cam 50 is engaged by the end of a stud 60 carried by a post or slide 61 mounted for vertical adjustment in the standard 35. The stud 60 is held in a bore at the upper end of the post 61 and secured in place by means of a nut 62 on its reduced threaded end. As shown in Figs. 1, 4 and 5, the post 61 is constituted as a cylindrical rod slidable in a vertical bearing 63 at the side of the standard 35. Preferably, the post 61 carries a key 64 on its side engaging a spline 65 in the bore of its bearing 63 to prevent the post from turning. Referring to Fig. 5, at the upper end of the bearing 63 is an ear 66 having a bore 69 extending transversely of the bore for the slide or post 61. Fitted in the transverse bore 69 is a two-part sleeve or bushing 70 cut away at 71 on the adjacent ends of its sections to receive the post 61. Extending through the bore of the two-part bushing 70 is a bolt 72 having its head abutting the end of the section 73 and its opposite threaded end screwed into the opposite section 74 of the bushing. This form of construction provides that when the bolt 72 is turned it will contract the bushing 70 by drawing the two sections 73 and 74 thereof together to clamp them against the post 61 to secure the latter in its adjusted position in its bearing 63.

The method of operation of the valve by remote control is as next explained. The operator, located upon the upper floor, has merely to turn the handwheel 55 to open and close the valve as desired. When the wheel 55 is turned in a clockwise direction the engagement of the cam 50 with the fixed stud 60 will cause the rod 34 to slide upwardly in the standard 35 and the valve-stem or lower spindle 20 will be drawn upwardly through its bearings in the member 15 to raise the closure 25 away from its seat 9, see Fig. 2 of the drawings. As the valve-closure 25 is lifted the outlet through the fitting 8 is opened to provide unrestricted flow of the fluid therethrough; and to close the valve the wheel 55 is turned in the reverse direction to force the closure 25 down against the seat 9. The gasket 33 on the under side of the closure 25 effects a tight, leak-proof joint with the seat 9 and, as before noted, the closure may rock slightly to aline the engaging surfaces.

The universal coupling between the valve-stem 20 and the extension rod 34 provides for a slight play between the two rods so that it is not required that the alinement of their axes be exact and accurate setting of the standard 35 is therefore unnecessary.

The vertical adjustment of the slide or post 61 provides for setting the stud 60 in proper position to insure the correct cooperation therewith of the cam 50, the arrangement being such that approximately a half turn of the handwheel will raise the valve off its seat to provide unrestricted flow of the fluid through the valve.

It is to be particularly noted that due to the novel construction and arrangement of the seat-fitting 8 there is no part thereof projecting above the floor of the valve housing so that the flow therethrough is unimpeded. Moreover, this form of construction eliminates shoulders and pockets in the housing liable to collect dirt and sediment.

It will be observed from the foregoing that the invention provides a novel form of valve having convenient means for removing and dressing the seat for the closure when its surfaces become worn. The opening in which the seat-fitting 8 is held is of sufficient size to allow access to the gasket 33 for resurfacing the latter when it becomes necessary and the fitting may be removed for turning down, grinding or refinishing its seat 9 when the latter becomes worn. The form of the fitting 8 is such that a considerable amount of material may be taken off from the seat 9 without impairing the strength of this part so that the seat may be refinished many times and still give efficient service.

The remote control means for the valve are particularly simple in construction yet adaptable for various applications between floors or in other locations. The arrangement of the coupling between the valve-stem and its upper extension rod provides that the longer length of rod may be made of relatively inexpensive material and only the relatively short valve-stem constructed of the more expensive material.

While the improved valve is herein shown and described as embodied in a preferred form of construction, various modifications may be made in the structure and arrangement of its parts without departing from the spirit or scope of the invention. Therefore, without limiting myself in this respect, I claim:

1. In a valve, the combination of a housing having inlet and outlet ports, a closure for closing one of said ports, a stem slidable in the housing to operate the closure, a rod forming an extension of the stem, a standard for slidably supporting the rod, means operative between the rod and standard to engage the rod and effect sliding movement of the rod when the latter is turned, said means being vertically adjustable with respect to the standard, and means for turning the rod.

2. In a valve, the combination of a housing having inlet and outlet ports, a closure for closing one of said ports, a stem slidable through the housing to operate the closure, a rod forming an extension of the stem, a standard in which said rod is slidably mounted, a cam on the rod, a post adjustable on the standard longitudinally of the rod, means on the post engaging the cam to slide the rod, and means for turning the rod.

3. In a valve, the combination of a housing having inlet and outlet ports, a closure operable to close one of the ports, a stem slidable through the housing and connected to operate the closure, a rod forming an extension of the stem, a universal joint between the rod and stem, a standard in which the rod is slidably and rotatably mounted, a cam on the rod, means on the standard adjustable longitudinally thereof and engaging the cam to slide the rod when the latter is rotated, and means for turning the rod.

4. In a valve, the combination of a housing having inlet and outlet ports, a closure for closing one of said ports, a stem slidable in the housing to operate the closure, a rod forming an extension of said stem, a universal joint connecting the end of the rod with the end of the stem, a standard in which the rod is mounted to rotate and slide longitudinally, said standard being adapted for support at a point remote from the valve, a post adjustable on the standard and having means operative to slide the rod when it is rotated in the standard, means for rotating the rod, and means for fastening the post in its adjusted position.

5. In a valve, the combination of a housing having inlet and outlet ports, a closure for closing one of said ports, a stem slidable in the housing for operating the closure, a rod forming an extension of the stem, means for coupling the end of the rod to the end of the stem to permit axial displacement therebetween, a standard having a bearing for embracing the rod, means for turning the rod, an adjustable post on the standard having means operative when the rod is turned in its bearing to slide the rod to operate the closure, and an extensible and contractible two-part bushing for locking the post in adjusted position in the standard when contracted.

6. In a valve, the combination of a housing having inlet and outlet openings, a detachable seat-member having an annular rim, means for attaching the seat-member to the housing with the annular rim extending into one of said openings, a closure cooperating with the rim of said seat to close the opening, a stem extending through the housing and slidable therein, a standard, and means for actuating the stem to move the closure to open and close the valve, said actuating means including a member engaging the stem and longitudinally adjustable on the standard whereby to vary the range of movement of the closure to insure its engagement with the annular rim of the seat after the latter has been resurfaced by grinding the rim.

JOHN MIDGLEY WOOD.